June 29, 1937.  J. W. NEITZEL ET AL  2,085,542
WHIPPING AND FREEZING MACHINE FOR FOOD PRODUCTS
Filed Nov. 23, 1935   2 Sheets-Sheet 1
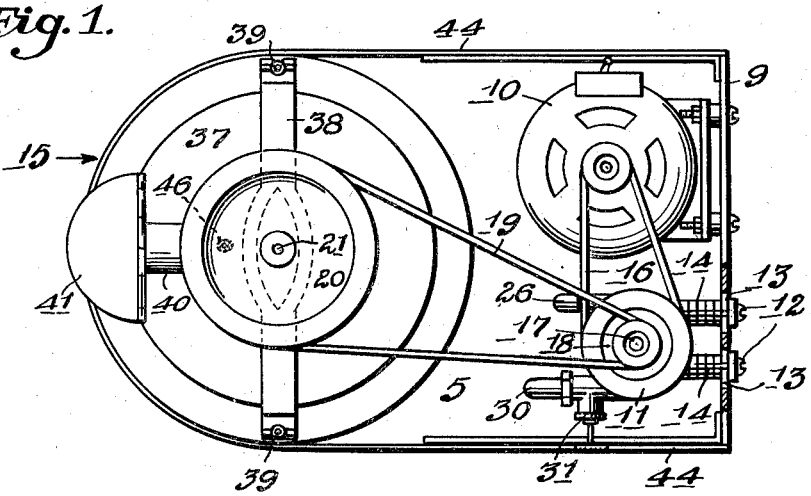
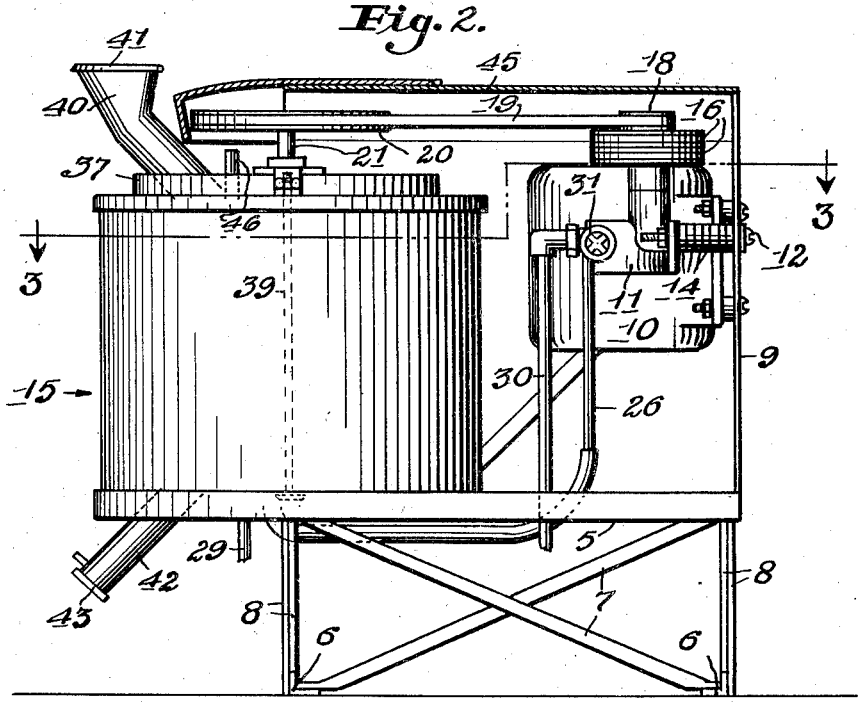
Jesse W. Neitzel
Robert G. Lipscomb
INVENTORS
BY
ATTORNEYS

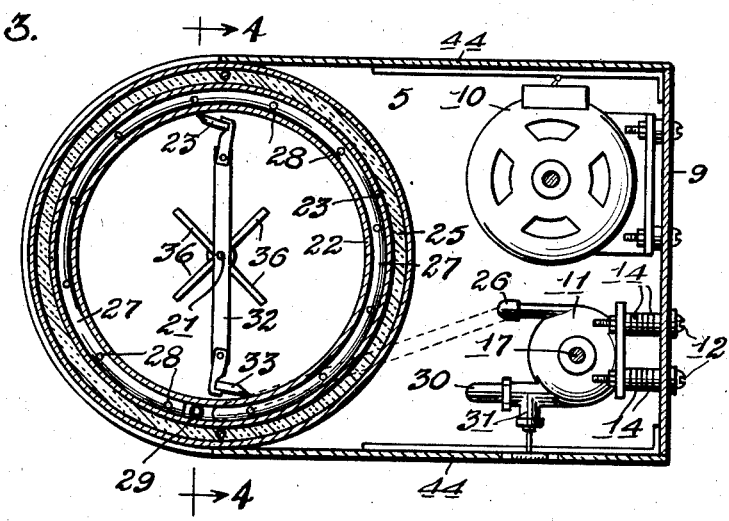
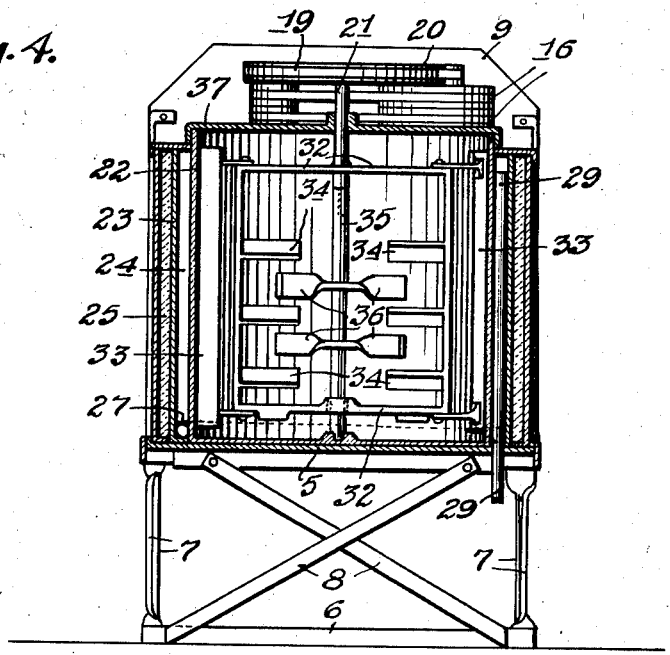

Patented June 29, 1937

2,085,542

UNITED STATES PATENT OFFICE 2,085,542

WHIPPING AND FREEZING MACHINE FOR FOOD PRODUCTS

Jesse W. Neitzel and Robert G. Lipscomb, Albert Lea, Minn., assignors to The Globe Machine & Manufacturing Company, Albert Lea, Minn., a corporation of Minnesota Application November 23, 1935, Serial No. 51,286

2 Claims. (Cl. 62—114)

This invention relates to a freezer for ice cream and other food products and particularly to a machine adapted for use in restaurants and retail stores where it is desirable to manufacture as well as dispense the product.

It is an object of our invention to provide an unusually compact, efficient and inexpensive machine of this class adapted to be connected to a refrigerating plant of the common brine type.

A particular object is to provide a novel machine of this class of such size and proportion and so constructed that it may be placed on a cabinet or freezing table from which the product is to be dispensed.

A further object is to provide improved means for circulating brine in the freezer and for operating the whipping or agitating mechanism.

The invention will be best understood by reference to the accompanying drawings in which, Figure 1 is a plan view of the machine with the hood or belt guard removed;

Fig. 2 is a side elevation of the machine with one side wall removed and the guard shown in vertical section;

Fig. 3 is a horizontal section taken on the line 3—3 of Fig. 2, and

Fig. 4 is a vertical section taken on the line 4—4 of Fig. 3.

The machine is mounted on a base plate 5 supported on legs comprising a pair of angle bars 6 joined by oblique members 7 at each side and by similar members 8 at each end. This arrangement of supporting members facilitates the spacing of the base plate above a freezing table in such a manner as to allow access to the openings in the table beneath the machine. At one end of the base plate is a rigid wall 9 affording a support for an electric motor 10 and a pump 11 each having a vertically disposed shaft. The motor is bolted to the wall 9 and the pump 11 is adjustably supported thereon by a pair of bolts 12 which extend through horizontally elongated slots 13 in the wall to permit movement of the pump toward and away from the motor. The pump is spaced from the wall 9 by a series of washers 14 to permit adjustment of the position of the pump relative to the freezer, indicated generally by the numeral 15. A pair of belts 16 and suitable pulleys drive the pump 11 from the motor 10. Fixed on the vertical pump shaft 17 is a pulley 18 for driving a belt 19 and the latter is trained on a driven pulley 20 fixed on a shaft 21 projecting from the top of the freezer 15.

The freezer 15 is secured to the base plate 5 and is of generally cylindrical form. As shown in Figs. 3 and 4, the freezer has an inner casing or lining 22 and an outer casing 23 spaced from the lining to afford an annular space 24 for the circulation of the cooling medium. The casing 23 is enclosed in a jacket of heat insulating material 25 and the brine or other cooling medium is conducted from the outlet of the pump 11 through a pipe 26 to the space 24. Efficient and uniform distribution of the cooling medium is insured by providing an arcuate pipe 27 having a multiplicity of outlet openings 28 at its upper periphery as indicated in Fig. 3. This arcuate pipe substantially encircles the lining 22 in the bottom of the space 24 and communicates with the pipe 26 at one side of the freezer. At the opposite side or periphery thereof a vertically disposed pipe 29 is arranged to withdraw the cooling medium from the upper portion of the space 24 and this pipe extends out through the bottom of the freezer and plate 5 to be connected to the refrigerating machine or brine cooler, not shown. The brine or other cooling medium is supplied to the pump 11 through a pipe 30 under control of a valve 31 located adjacent to the pump.

Agitating mechanism within the freezer comprises pairs of radially extending arms 32 fixed on the shaft 21 and carrying pivoted scrapers 33 for engaging the lining 22 and also rigid pairs of stirring fingers 34 extending approximately in a vertical plane through the arms 32. Removably supported coaxially with the shaft 21 is a shaft 35 having pairs of fixed arms 36 extending between the fingers 34. The lower end of the shaft 35 fits in a key socket in the bottom of the freezer and its upper end has a rotary connection with the shaft 21 so that the shaft 35 remains stationary in operation while the arms 32 rotate carrying the fingers 34 and scrapers 33. The entire agitating mechanism may be removed from the freezer as a unit upon removal of a cover 37 which is normally retained in sealing relation to the top of the freezer by a horizontally extending clamp 38 having its ends secured to the freezer casing by a pair of wing bolts 39. These bolts extend vertically in the jacket of insulation and have their heads secured to the base plate 5.

To facilitate charging the freezer with the ingredients for the ice cream or other product, the cover 38 has mounted thereon, at one side, a funnel-like conduit 40 communicating with the interior of the freezer and provided with a hinged cap 41. Projecting from the bottom of the freezer is a discharge conduit 42 under control of a pivoted closure or gate 43. Air is admitted to the freezing chamber through a small vent pipe 46 projecting from the cover 37. The motor and pump are preferably enclosed between side walls 44 and the top of the mechanism is covered and guarded by a suitable hood 45.

*Operation*

In operation the machine is placed at any convenient place on a counter or freezing table and the pipes 29 and 30 are connected to the inlet and outlets respectively of a brine cooler or other suitable refrigerating machine. The tension of the belt 19 may be adjusted by placing the proper number of washers 14 on the bolts 12 and the tension of the belts 16 may be adjusted by securing the bolts 12 in suitable positions in the slots 13. With the valve 31 open, the motor 10 is started to operate the pump 11 through the belts 16 and associated pulleys. Operation of the pump causes the delivery of the cooling medium to the pipe 26 whence it passes to the arcuate pipe 27 and is distributed uniformly throughout the bottom of the jacket space 24 of the freezer. The cooling medium flows up in contact with the heat conducting liner 22 and returns to the refrigerating machine or cooler through the pipe 29 which communicates with the upper portion of the space 24, the pump 11 being supplied with the chilled brine or other cooling medium through the pipe 30 and valve 31. The ingredients for the ice cream or other product are introduced into the freezer through the conduit 40 and are agitated by the mechanism within the freezer through the connections with the motor including the shaft 21, pulley 20, belt 19, pulley 18, shaft 17, belt 16 and associated pulleys. When the product has been chilled sufficiently, the supply of cooling medium may be cut off by closing the valve 31 while the whipping of the product is continued until it has acquired the desired consistency. Finally the product is discharged through the conduit 42, either into receptacles to be dispensed immediately to customers or into one of the cooling wells or containers of the freezing table to be dispensed therefrom after further solidification.

We have found that our improved freezer operates rapidly and produces an excellent product and that the time required for freezing is greatly reduced by our arrangement of the arcuate pipe 27 which uniformly distributes the cooling medium within the jacket space. The machine is also unusually compact and quiet in operation because of our arrangement of the belts, pump and motor relative to the freezer.

Having described our invention, what we claim as new and desire to protect by Letters Patent is:

1. In a machine of the class described, a cylindrical ice cream freezer disposed with its axis in vertical position and having a liner and casing spaced apart to afford an annular space for a cooling medium, a pipe substantially encircling the bottom of said freezer within said space and having a multiplicity of discharge openings for distributing a cooling medium in said space, an outlet for cooling medium communicating with the upper portion of said space, means for circulating a cooling medium through said pipe, space and outlet and means for agitating the product within said freezer.

2. In a machine of the class described, a cylindrical ice cream freezer disposed with its axis in vertical position and having a liner and casing spaced apart to afford an annular space for a cooling medium, a pipe substantially encircling the bottom of said freezer within said space and having a multiplicity of discharge openings for distributing a cooling medium uniformly in said space, an outlet for the cooling medium communicating with the upper portion of said space, means for circulating a cooling medium into said pipe and out through said outlet, an axial shaft projecting from the top of said freezer, means for agitating the product within said freezer operatively connected to said shaft and a motor operatively connected to said shaft and circulating means.

JESSE W. NEITZEL.
ROBERT G. LIPSCOMB.